United States Patent
Lidzborski et al.

(10) Patent No.: US 11,683,159 B2
(45) Date of Patent: Jun. 20, 2023

(54) HYBRID CONTENT PROTECTION ARCHITECTURE

(71) Applicant: Google LLC, Mountain View, CA (US)

(72) Inventors: Nicolas Lidzborski, Mountain View, CA (US); Laetitia Estelle Baudoin, Mountain View, CA (US); Vivek Prahlad Bhandari, Mountain View, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 16/677,264

(22) Filed: Nov. 7, 2019

(65) Prior Publication Data
US 2021/0143983 A1 May 13, 2021

(51) Int. Cl.
| | |
|---|---|
| *H04L 9/08* | (2006.01) |
| *G06F 21/30* | (2013.01) |
| *G06F 21/60* | (2013.01) |
| *G06F 21/62* | (2013.01) |
| *H04L 9/32* | (2006.01) |

(52) U.S. Cl.
CPC .............. *H04L 9/083* (2013.01); *G06F 21/30* (2013.01); *G06F 21/602* (2013.01); *G06F 21/6218* (2013.01); *H04L 9/3234* (2013.01)

(58) Field of Classification Search
CPC ....... H04L 9/083; G06F 21/30; G06F 21/602; G06F 21/6218
See application file for complete search history.

(56) References Cited

U.S. PATENT DOCUMENTS

| | | | |
|---|---|---|---|
| 9,225,691 B1 | 12/2015 | Balasubramanian et al. | |
| 9,608,809 B1 | 3/2017 | Ghetti et al. | |
| 2004/0101141 A1* | 5/2004 | Alve | H04L 9/083 380/278 |
| 2006/0010324 A1* | 1/2006 | Appenzeller | H04L 9/083 713/171 |
| 2013/0298202 A1* | 11/2013 | Warshavsky | H04L 63/10 726/4 |
| 2013/0305054 A1* | 11/2013 | Burchett | H04L 63/062 713/185 |

(Continued)

OTHER PUBLICATIONS

International Search Report and the Written Opinion for the related Application No. PCT/US2020/059321, dated Feb. 1, 2021, 16 pages.

*Primary Examiner* — Tongoc Tran
(74) *Attorney, Agent, or Firm* — Honigman LLP; Brett A. Krueger (57) ABSTRACT

A method for a hybrid content protection architecture includes obtaining, by data processing hardware, a client-side cryptographic key and locally encrypting user content using the client-side cryptographic key. The method also includes communicating the client-side cryptographic key to a third party key manager, the third party key manager configured to store the client-side cryptographic key. In response to the third party key manager storing the client-side cryptographic key, the method includes receiving a token from the third party key manager, the token identifying the client-side cryptographic key stored at the third party key manager. The method further includes uploading the encrypted user content and the token to a server of a cloud computing platform.

26 Claims, 6 Drawing Sheets

(56) References Cited

U.S. PATENT DOCUMENTS

| | | | |
|---|---|---|---|
| 2014/0215590 A1* | 7/2014 | Brand | G06F 9/5072 |
| | | | 726/6 |
| 2014/0270178 A1* | 9/2014 | Kiang | G06F 21/602 |
| | | | 380/281 |
| 2014/0281477 A1 | 9/2014 | Nayshtut et al. | |
| 2015/0200958 A1* | 7/2015 | Muppidi | H04L 41/28 |
| | | | 726/23 |
| 2016/0140335 A1* | 5/2016 | Proulx | H04L 9/0863 |
| | | | 726/6 |
| 2016/0241390 A1* | 8/2016 | Harris | H04L 9/083 |
| 2017/0250859 A1* | 8/2017 | Gheorghe | H04L 65/80 |
| 2018/0026973 A1* | 1/2018 | Le Saint | G06Q 20/32 |
| | | | 713/168 |
| 2019/0139039 A1* | 5/2019 | Chawan | G06Q 20/382 |
| 2021/0243026 A1* | 8/2021 | Mohassel | H04L 9/3239 |

\* cited by examiner

HYBRID CONTENT PROTECTION ARCHITECTURE

TECHNICAL FIELD

This disclosure relates to a hybrid content protection architecture.

BACKGROUND

Today cloud computing platforms (CCPs) may provide a wide range of functionality to clients (or users) of these platforms. In some cases, this functionality has evolved from more simple offerings, such as storage for client resources or providing additional distributed computing resources to clients, to more complex offerings of applications or application programming interfaces (APIs) that may integrate with other computing systems. For example, many CCPs offer software services, such as electronic mail applications, communication applications (e.g., messaging, audio/visual communication, etc.), storage applications, data processing application, etc. As these software services have grown, more and more client data is being accessed, transferred, modified, and/or stored during the use of these services.

SUMMARY

One aspect of the disclosure provides a method for a hybrid content protection architecture. The method includes obtaining, by data processing hardware, a client-side cryptographic key and locally encrypting, by the data processing hardware, user content using the client-side cryptographic key. The method also includes communicating, by the data processing hardware, the client-side cryptographic key to a third party key manager. The third party key manager is configured to protect the client-side cryptographic key. In response to the third party key manager protecting the client-side cryptographic key, the method includes receiving, at the data processing hardware, a token from the third party key manager, the token identifying the client-side cryptographic key protected by the third party key manager. The method further includes uploading, by the data processing hardware, the encrypted user content and the token to a server of a cloud computing platform.

Implementations of the disclosure may include one or more of the following optional features. In some implementations, the method includes receiving, at the data processing hardware, the user content at a client-facing library associated with an application interface of the cloud computing platform and identifying, by the data processing hardware, a user associated with the user content to be stored on the server of a cloud computing platform. The client-side cryptographic key may include a length of 256 bits.

In some examples, the user content includes a plurality of individual pieces of content and obtaining the client-side cryptographic key may include obtaining a unique respective client-side cryptographic key for each individual piece of content of the plurality of individual pieces of content. In this example, locally encrypting the user content includes locally encrypting each individual piece of content of the plurality of individual pieces of content using the respective client-side cryptographic key.

In some configurations, prior to communicating the client-side cryptographic key, the method includes authenticating, by the data processing hardware, the third party key manager. Here, authenticating the third party key manager may include requesting authentication credentials for the third party key manager from an identity provider service, the identity provider service external to the cloud computing platform. Optionally, the third party key manager may include a different entity than a provider of the cloud computing platform.

In some implementations, the method includes receiving, at the data processing hardware, a retrieval request for retrieving the encrypted user content from the server of the cloud computing platform and retrieving, by the data processing hardware, the encrypted user content and the token from the server of the cloud computing platform. In this implementation, the method also includes retrieving, by the data processing hardware, the client-side cryptographic key from the third party key manager using the token and decrypting, by the data processing hardware, the encrypted user content using the client-side cryptographic key.

Another aspect of the disclosure provides a method for a hybrid content protection architecture. The method includes receiving, at data processing hardware, a retrieval request for retrieving encrypted user content stored at a server of a cloud computing platform. The encrypted user content is locally encrypted by the data processing hardware using a client-side cryptographic key. The client-side cryptographic key is never exposed to the server of the cloud computing platform. The method also includes retrieving, by the data processing hardware, from the server of the cloud computing platform the encrypted user content and a token identifying the client-side cryptographic key. The token originates from a third party key manager configured to unwrap the client-side cryptographic key. The method further includes retrieving, by the data processing hardware, the client-side cryptographic key from the third party key manager using the token and decrypting, by the data processing hardware, the encrypted user content using the client-side cryptographic key.

This aspect may include one or more of the following optional features. In some examples, the client-side cryptographic key includes a length of 256 bits. The encrypted user content may include a plurality of individual pieces of content and retrieving the client-side cryptographic key from the third party key manager may include, for each individual piece of content of the plurality of individual pieces of content, retrieving a respective client-side cryptographic key. Each respective client-side cryptographic key may be unique.

In some configurations, the method includes authenticating, by the data processing hardware, the third party key manager. Here, authenticating the third party key manager may include requesting authentication credentials for the third party key manager from an identity provider service, the identity provider service external to the cloud computing platform. Optionally, the third party key manager may include a different entity than a provider of the cloud computing platform.

Another aspect of the disclosure provides a system for a hybrid content protection architecture. The system includes, data processing hardware and memory hardware in communication with the data processing hardware. The memory hardware stores instructions that when executed on the data processing hardware cause the data processing hardware to perform operations. The operations include obtaining a client-side cryptographic key and locally encrypting user content using the client-side cryptographic key. The operations also include communicating the client-side cryptographic key to a third party key manager. The third party key manager is configured to protect the client-side cryptographic key. In response to the third party key manager protecting the client-side cryptographic key, the operations include receiving a token from the third party key manager. The token identifies the client-side cryptographic key protected by the third party key manager. The operations further include uploading the encrypted user content and the token to a server of a cloud computing platform.

This aspect of the disclosure may include one or more of the following optional features. In some configurations, the operations include receiving the user content at a client-facing library associated with an application interface of the cloud computing platform and identifying a user associated with the user content to be stored on the server of a cloud computing platform. The client-side cryptographic key may include a length of 256 bits.

In some examples, the user content may include a plurality of individual pieces of content and obtaining the client-side cryptographic key includes obtaining a unique respective client-side cryptographic key for each individual piece of content of the plurality of individual pieces of content. In this example, locally encrypting the user content includes locally encrypting each individual piece of content of the plurality of individual pieces of content using the respective client-side cryptographic key.

In some implementation, the operations include, prior to communicating the client-side cryptographic key, authenticating the third party key manager. Here, authenticating the third party key manager may include requesting authentication credentials for the third party key manager from an identity provider service, the identity provider service external to the cloud computing platform. Optionally, the third party key manager may include a different entity than a provider of the cloud computing platform.

In some implementations, the operations include receiving a retrieval request for retrieving the encrypted user content from the server of the cloud computing platform and retrieving the encrypted user content and the token from the server of the cloud computing platform. In this implementation, the operations also include retrieving the client-side cryptographic key from the third party key manager using the token and decrypting the encrypted user content using the client-side cryptographic key.

Yet another aspect of the disclosure provides a system for a hybrid content protection architecture. The system includes data processing hardware and memory hardware in communication with the data processing hardware. The memory hardware stores instructions that when executed on the data processing hardware cause the data processing hardware to perform operations. The operations include receiving a retrieval request for retrieving encrypted user content stored at a server of a cloud computing platform, the encrypted user content locally encrypted by the data processing hardware using a client-side cryptographic key. The client-side cryptographic key is never exposed to the server of the cloud computing platform. The operations also include retrieving from the server of the cloud computing platform the encrypted user content and a token identifying the client-side cryptographic key. The token originates from a third party key manager configured to unwrap the client-side cryptographic key. The operations further include retrieving the client-side cryptographic key from the third party key manager using the token and decrypting the encrypted user content using the client-side cryptographic key.

This aspect of the disclosure may include one or more of the following optional features. In some examples, the client-side cryptographic key includes a length of 256 bits. The encrypted user content may include a plurality of individual pieces of content and retrieving the client-side cryptographic key from the third party key manager may include, for each individual piece of content of the plurality of individual pieces of content, retrieving a respective client-side cryptographic key. Each respective client-side cryptographic key may be unique.

In some configurations, the operations include authenticating the third party key manager. Authenticating the third party key manager may include requesting authentication credentials for the third party key manager from an identity provider service, the identity provider service external to the cloud computing platform. The third party key manager may include a different entity than a provider of the cloud computing platform.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A client of a cloud provider may have security practices pursuant to which the client does not assume trust (in the cryptographic/security sense) of its cloud service provider(s). For example, the client may wish to encrypt data stored or handled by the provider but also may wish to avoid trusting the provider to handle the corresponding encryption keys. In the examples shown, the cloud computing environment 100 includes a hybrid content protection architecture. In this architecture, the client uses the CCP to encrypt and/or decrypt client content with a cryptographic key managed by a third party. With this configuration, encryption protects the client content from the risk of client content exposure at the CCP while the third party with the key does not possess the client content to perform decryption. In other words, neither the CCP nor the third party possesses all the tools simultaneously to expose the client data. Using this architecture, the client may take advantage of the CCP without having to fully trust it.

Figure 1A:
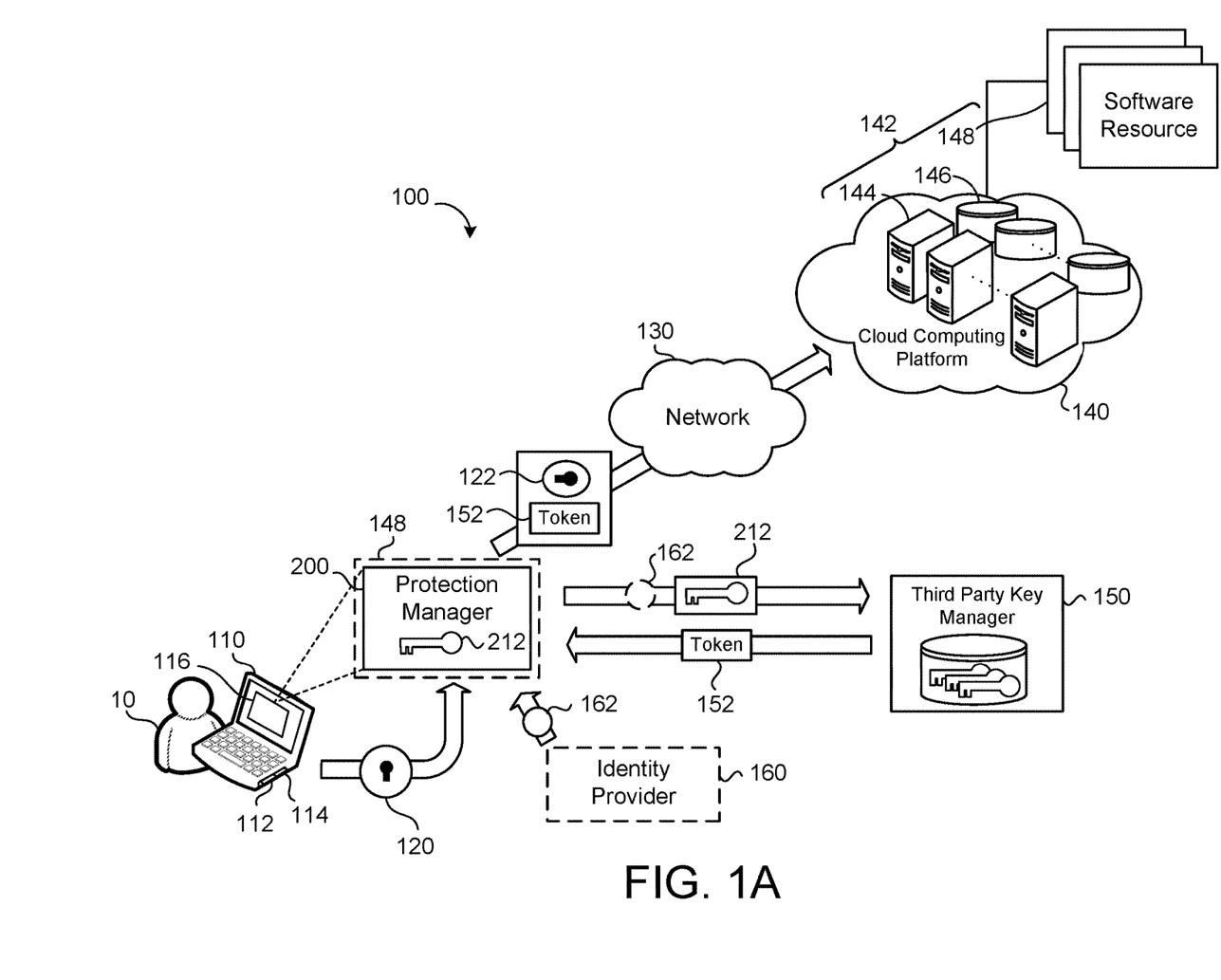
FIGS. 1A and 1B are schematic views of example computing environments using a data encryption system.
Figure 1B:
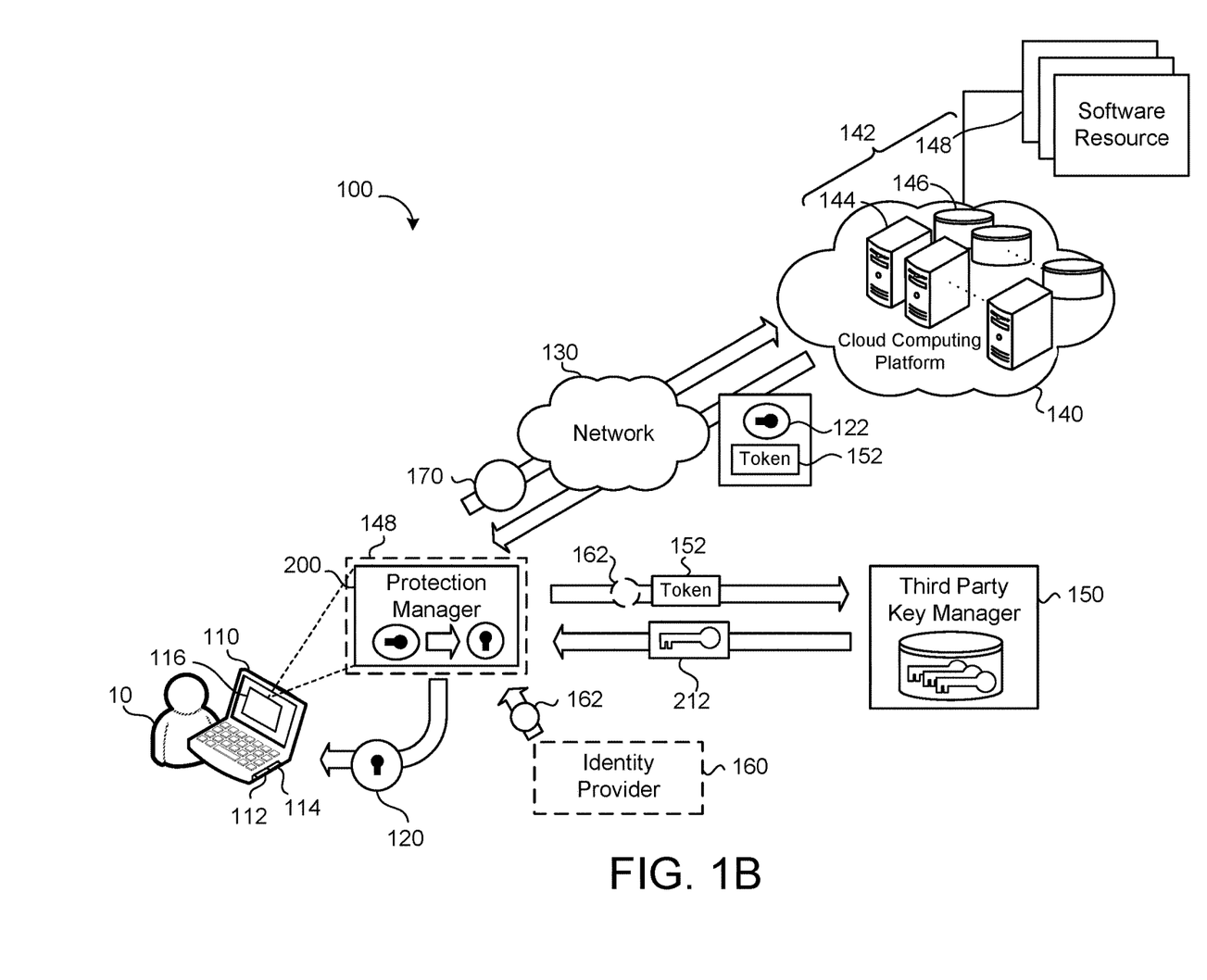

FIGS. 1A and 1B are examples of a cloud computing environment 100. The cloud computing environment 100 generally includes a user device 110 (e.g., also referred to as a client device) associated with a user 10 (e.g., also referred to as a client) that is capable of communicating user content 120 (e.g., also referred to as client content/data) over a network 130 to a portion (e.g., a backend) of a CCP 140. The CCP 140 may refer to a distributed system having scalable/elastic resources 142 (e.g., a storage abstraction) remote from local resources of the user device 110. The resources 142 include hardware resources 144 (e.g., data processing hardware), storage resources 146 (e.g., memory hardware), and/or software resources 148 (e.g., client-facing software such as web-based applications or application programming interfaces (APIs)). In some examples, the user 10 interfaces with the resources 142 of the CCP 140 using the user device 110 (e.g., using a web-browser application 116). In some configurations, when the user 10 interfaces with software resources 148 of the CCP 140, the software resources 148 include cryptographic signatures to provide code integrity protection.

The user device 110 can be any computing device or data processing hardware capable of communicating with the CCP 140. Some examples of user devices 110 include, but are not limited to, desktop computing devices, mobile computing devices, such as laptops, tablets, smart phones, and wearable computing devices (e.g., headsets and/or watches). As a computing device, the user device 110 includes data processing hardware 112 and memory hardware 114 configured to communicate with the data processing hardware 112 to execute various processes. Here, FIGS. 1A and 1B depict the user device 110 using data processing hardware 112 to execute applications 116 (e.g., applications that have been downloaded and stored in the memory hardware 114). For instance, the user device 110 executes a web-browser application 116 to communicate with the CCP 140. Here, the CCP 140 may offer web-based services accessible to the user device 110 via the web-browser application 116.

In some examples, when the user 10 interacts with the CCP 140, the user 10 provides and/or generates user content 120. For example, the user 10 generates user content 120 at a user interface (UI) for an application (i.e., a software resource 148) of the CCP 140. User content 120 generally refers to data owned or controlled by the user 10, such as files, documents, messages, or other data assets. In some examples, the user 10 provides the user content 120 to the CCP 140 in order for the CCP 140 to perform various client services (e.g., storage services, computing services, etc.).

When the user 10 introduces user content 120 to the CCP 140, a protection manager 200 is configured to identify the user content 120 as a potential candidate for content protection. In some examples, the protection manager 200 is a client-facing function of a portion of the CCP 140. For instance, the CCP 140 integrates the protection manager 200 in the frontend code of one or more CCP applications (e.g., a client-facing library embedded into code paths that manage user data at a CCP application). By integrating the protection manager 200 in frontend code of CCP applications, the CCP recognizes that, when a user 10 provides or shares user content 120 with the CCP 140, the user 10 may want to protect the user content 120. Furthermore, by being client-facing, the protection manager 200 affords the user 10 with the opportunity to protect user content 120 before the user 10 cedes total control of the user content to the CCP 140. For instance, the user 10 wants to store the user content 120 in the storage resources 146 (e.g., servers) of the CCP 140, but opts to protect the user content 120 at the protection manager 200 before the user 10 communicates the user content 120 to the storage resources 146.

In some implementations, the user 10 initiates protection of user content 120 at the protection manager 200 (e.g., a user request for protection). In other implementations, the protection manager 200 identifies user content 120 and either automatically protects the user content 120 or protects the user content 120 with permission from the user 10. In yet other implementations, the protection manager 200 is configured such that both the user 10 may initiate a content protection request and the protection manager 200 may self-serve user content protection. In some examples, the user 10 or an administrator of the CCP 140 employing the protection manager 200 designates types of user content 120 that is in-scope for the protection manager 200. When the protection manager 200 receives and/or identifies the type of user content 120 that is in-scope, the protection manager 200 is configured to always protect the user content 120 before being communicated to a remote endpoint (e.g., remote resources 142 of the CCP 140).

To protect user content 120, the protection manager 200 is configured to encrypt and/or decrypt user content 120. For instance, the protection manager 200 encrypts user content 120 prior to an upload of the user content 120 to the remote resources 142 of the CCP 140 (e.g., as shown in FIG. 1A) and decrypts user contents 120 locally at the user device 110 after a download of the user contents 120 from remote resources 142 of the CCP 140 (e.g., as shown in FIG. 1B). In storage-based CCP applications, the protection manager 200 may be injected into existing upload and/or download flows to provide its protection services to user content 120 that travels through these flow paths. In content editor applications, the protection manager 200 may be part of the local read/write functionality such that the protection manager 200 reads/writes blob versions for document-based user content 120 as the form of protection where the protection manager 200 encrypts/decrypts the blob versions.

When the protection manager 200 encrypts/decrypts the user content 120, the protection manager 200 is responsible for communication with third party systems such as the third party key manager 150 and/or the identify provider 160. For example, the protection manager 200 communicates with the third party key manager 150 and/or the identify provider 160 using hypertext transfer protocol secure (HTTPS) requests or cross-origin resource sharing (CORS) requests. Here, the third party key manager (3PKM) 150 refers to a third party service that protects a key 212 that the protection manager 200 uses to encrypt/decrypt user content 120. In some examples, the 3PKM 150 is a service that protects the key 212 using an access control list (ACL). In some configurations, the 3PKM 150 includes a key management system (KMS) or a hardware management system (HMS) that protects the key 212 when the key 212 is received at the 3PKM 150 by wrapping/unwrapping the key 212. Here, wrapping refers to a cryptographic process (e.g., a key wrapping algorithm) that uses symmetric encryption to encapsulate key material (e.g., key 212). Unwrapping generally refers to the reverse process where the key material that has been encapsulated using a cryptographic process is decrypted to the key material (e.g., the key 212). To wrap/unwrap the key 212, the 3PKM 150 may receive the key 212 and encrypts/decrypts the key 212 using a key encryption key (KEK) that permanently resides in the 3PKM 150 (e.g., at the KMS or the HMS). When the 3PKM 150 receives a key 212 from the protection manager 200, the 3PKM 150 protects the key 212 and returns a token 152 to the protection manager 200 in response to the receipt of the key 212. In some examples, the token 152 is a cryptographic token 152 that corresponds to an encrypted form of the key 212 when the KEK encrypts the key 212. After the key 212 has been wrapped by the 3PKM 150, the 3PKM 150 may store the protected key 212 (i.e., wrapped key) or send the protected key 212 (i.e., wrapped key) to another storage location (e.g., at the user device 110 of the client 10 or at the CCP 140). In some implementations, storing the key 212 that has been encrypted by the 3PKM 150 with the encrypted user content 122 may provide benefits such as consistent data location, backup, and/or reliability.

Although the 3PKM 150 may store keys 212 for protecting user content 120, the 3PKM 150 does not store the user content 120 in any form (e.g., encrypted or decrypted). Rather, the protection manager 200 encrypts the user content 120 with a key 212 (e.g., a client-side cryptographic key) at the user device 110 and communicates the encrypted user content 122 and the token 152 from the 3PKM 150 to remote resources 142 of the CCP 140. Based on this configuration, the CCP 140 has encrypted user content 122 with an associated token 152, but no key is accessible to the CCP 140 to decrypt the user data 120.

In some implementations, the 3PKM 150 with the identity provider 160 is configured to ensure that an unauthorized party does not try to gain possession of the key 212 stored at the 3PKM 150. For instance, the 3PKM 150 and/or the identity provider 160 prevent unilateral access to keys 212 at the 3PKM 150 by an entity of the CCP 140 that has not been validated. In other words, since an entity of the CCP 140 may have access to the encrypted user content 122, further access to the key 212 at the 3PKM 150 would potentially remove the protection and expose the user content 120. Due to this possibility, the identity provider 160 is configured to provide authentication for an entity that should have access to the key 212 (e.g., to decrypt the user content 120 for the user 10). To illustrate, the protection manager 200 at the user device 110 of the user 10 should have access to retrieve the key 212 from the 3PKM 150. Here, the identity provider 160 provides an authentication token 162 to the protection manager 200 at the user device 110 such that the protection manager 200 may provide the authentication token 162 to the 3PKM 150 during a key retrieval request. In some examples, when the 3PKM 150 receives an authentication token 162, the 3PKM 150 determines whether the entity identified by the authentication token 162 has authorization to access the requested key (e.g., based on an ACL at the 3PKM 150). When the 3PKM 150 determines that the authentication token 162 is received from an authorized entity, the 3PKM 150 complies with the key request by returning the requested key 212. For example, in FIG. 1B, the 3PKM 150 returns a key 212 corresponding to the token 152 of the key request from an authorized entity (e.g., the protection manager 200 at the user device 110).

With continued reference to FIG. 1A, the protection manager 200 obtains a key 212 (e.g., a cryptographic key) to protect the user content 120. Here, the key 212 may be obtained from multiple sources considered to be secure. The sources may include applications 116 at the user device 110 (e.g., a web-browser application), hardware 112, 114 of the user device 110, or some remote source that the user 10 trusts to be secure (e.g., a key server or remote service that generates keys 212). With the key 212, the protection manager 200 locally encrypts the user content 120 to form encrypted user content 122. Once the protection manager 200 forms the encrypted user content 122, the key 212 is communicated to the 3PKM 150 for storage at the 3PKM 150 and in exchange for the token 152. When the protection manager 200 receives the token 152, the protection manager 200 communicates the encrypted user content 122 along with the token 152 to the remote computing resources 142 of the CCP 140.

In contrast, FIG. 1B depicts the protection manager 200 decrypting encrypted user content 122. Here, the encrypted user content 122 is downloaded to the user device 110 and the protection manager 200 decrypts the encrypted user content 122 locally at the user device 110. In this example, the protection manager 200 makes a retrieval request 170 to the CCP 140 (e.g., a remote resource 142 such as a server of the CCP 140). In some examples, the retrieval request 170 includes a request for a particular piece of encrypted user content 122 along with its associated token 152. In some configurations, the CCP 140 is configured to identify that a retrieval request 170 that specifies encrypted user content 122 should be fulfilled by accompanying the token 152 corresponding to the specified encrypted user content 122. Here, the user 10 may initiate the request 170 at the user device 110. Once the protection manager 200 receives the token 152, the protection manager 200 communicates the token 152 to 3PKM 150 in order to retrieve the key 212 corresponding to the token 152. With the key 212 for the encrypted user content 122 from the 3PKM 150, the protection manager 200 decrypts the encrypted user content 122.

Figure 2:
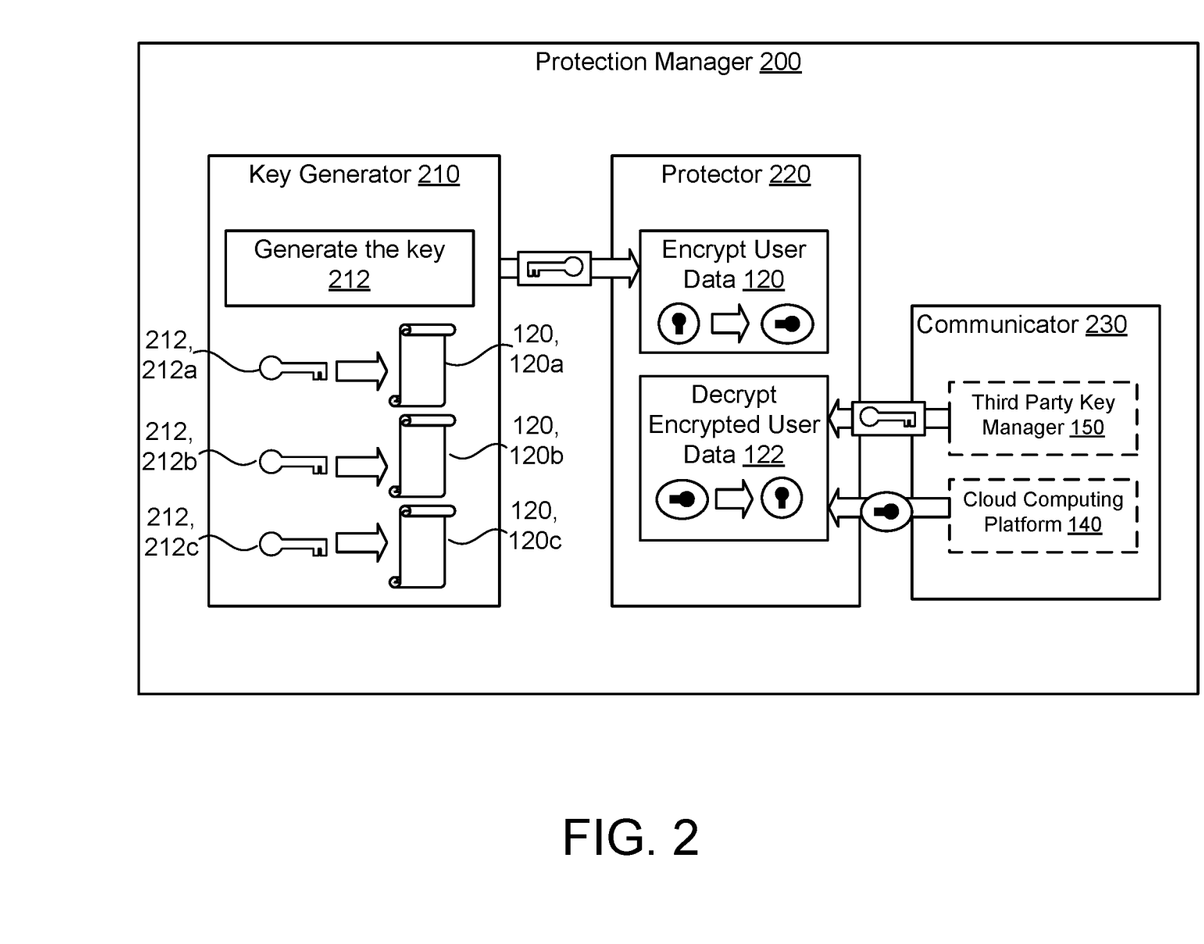
FIG. 2 is a schematic view of an example protection manager.

Referring to FIG. 2, the protection manager 200 includes a key generator 210, a protector 220, and a communicator 230. The key generator 210 is configured to generate the key 212 locally at the user device 110. In some examples, the key 212 is a cryptographic key 212 such that the key may be used to either encrypt or decrypt data, depending on the circumstances. In some examples, the key 212 is a 256-bit key. For instance, the key 212 uses an advanced encryption standard (AES) symmetric block cipher that operates with a 256-bit key size (e.g., length of 256 bits). Here, the block cipher may operate in a galois counter mode (GCM). With a cryptography algorithm, such as an AES-256-GCM, the key 212 provides both data authenticity (i.e., integrity) as well as data confidentiality.

In some configurations, as shown by FIG. 2, the key generator 210 generates a key 212 for each individual piece of user content 120. For example, FIG. 2 shows three keys 212, 212a-c where each key 212 corresponds to a single piece of user content 120, 120a-c. Although not shown, the use of a key 212 is relatively straightforward for different pieces of user content, but may become more complicated when user content 120 is duplicated. For user content duplication, there may be a few different approaches taken by the protection manager 200. In a first approach, the protection manager 200 promotes maximum isolation and provides the duplication with a new key 212. In a second approach, the protection manager 200 rewraps the key 212 such that the encrypted bytes can stay the same. Here, this second approach may be performed quickly, but with the tradeoff of anonymity at the CCP 140 due to identical encrypted bytes. In a third approach, the duplication receives the token 152 as its key 212. In this approach, there is no need to engage with the 3PKM 150 because it can be entirely managed on the server side. Yet a setback to this approach is that decryption events are no longer tied to the specific resource that was accessed; therefore, making audit logs difficult to review.

The protector 220 is the part of the protection manager 200 that is configured to encrypt or to decrypt the user content 120. To encrypt the user content 120, the protection manager 200 does not need any additional components from non-local entities (e.g., the CCP 140, the 3PKM 150, or the identity provider 160). In other words, the protector 220 receives the key 212 generated by the key generator 210 and is able to encrypt user content 120. In contrast, when the protector 220 decrypts encrypted user content 122, the protector 220 cannot autonomously operate. Instead the protector 220 leverages the communicator 230 to acquire the encrypted user content 122 from the CCP 140 (e.g., a server of the CCP 140) and the key 212 that originally encrypted the user content 120 from the 3PKM 150. Accordingly, the communicator 230 is configured to communicate with the non-local entities (e.g., the CCP 140, the 3PKM 150, or the identity provider 160) to enable the functionality of the protector 220.

Figure 3:
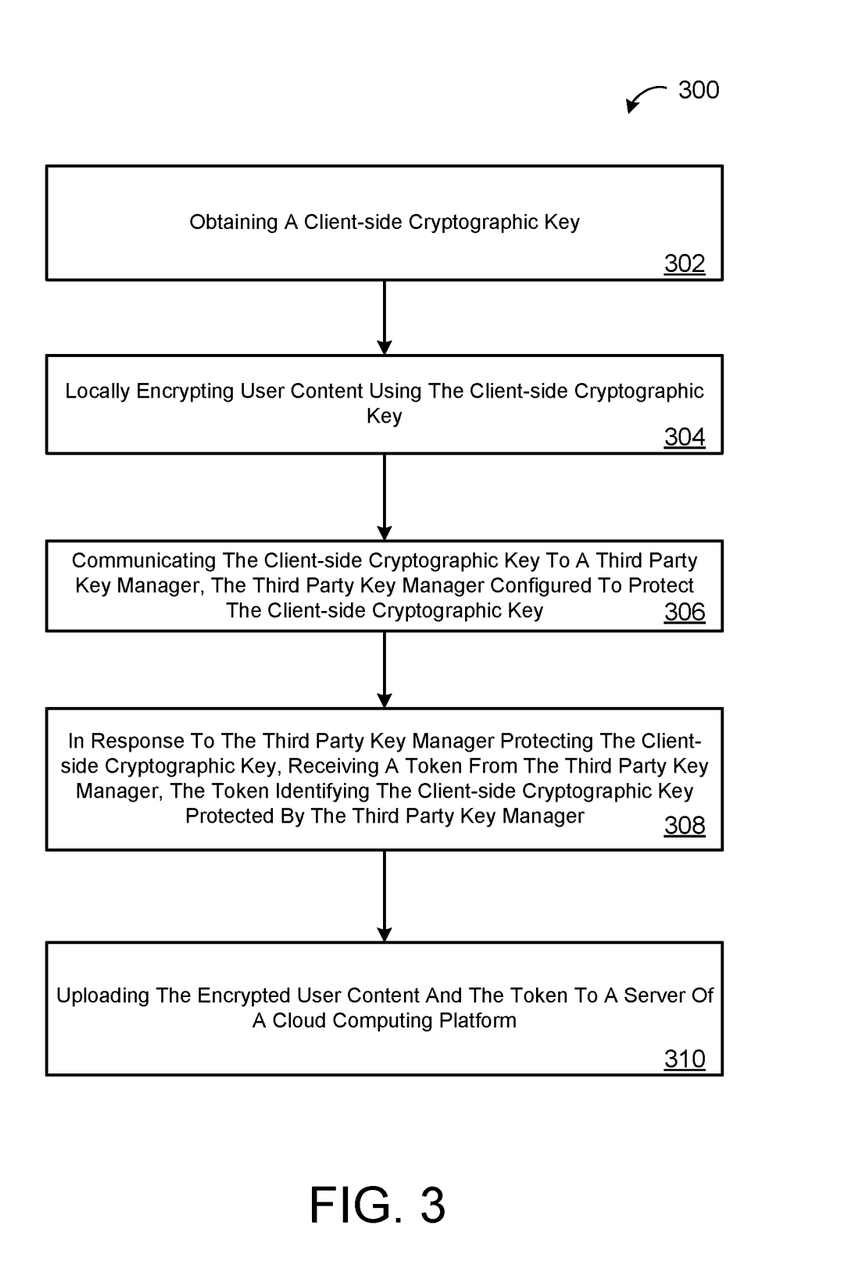
FIG. 3 is an example arrangement of operations for the data protection manager to encrypt data.

FIG. 3 is an example arrangement of operations for a method 300 to encrypt user content 120. At operation 302, the method 300 receives a client-side cryptographic key 212. At operation 304, the method 300 locally encrypts user content 120 using the client-side cryptographic key 212. At operation 306, the method 300 communicates the client-side cryptographic key 212 to the third party key manager 150 where the third party key manager 150 is configured to store the client-side cryptographic key 212. At operation 308, in response to the third party key manager 150 storing the client-side cryptographic key 212, the method 300 receives a token 152 from the third party key manager 150 where the token 152 identifies the client-side cryptographic key 212 stored at the third party key manager 150. At operation 310, the method 300 uploads the encrypted user content 122 and the token 152 to a server 142 of a cloud computing platform 140.

Figure 4:
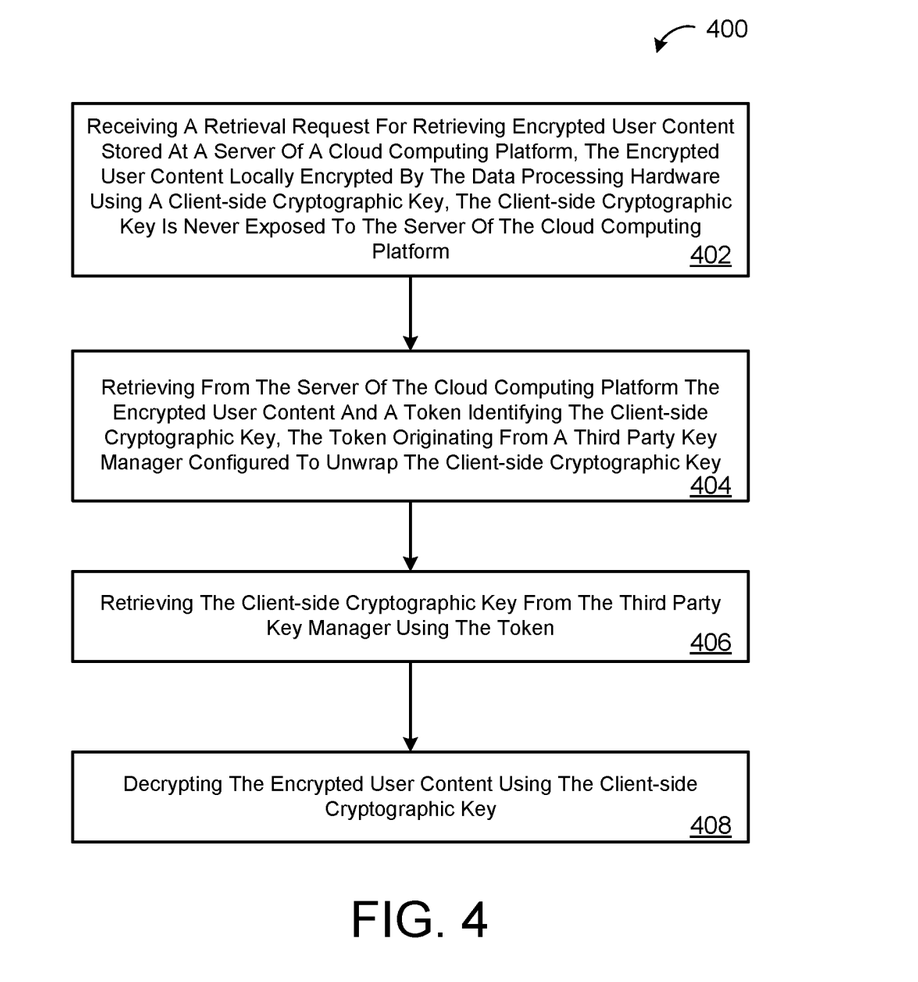
FIG. 4 is an example arrangement of operations for the data protection manager to decrypt data.

FIG. 4 is an example arrangement of operations for a method 400 to decrypt user content 120. At operation 402, the method 400 receives a retrieval request 170 for retrieving encrypted user content 122 stored at a server 142 of a cloud computing platform 140 where the encrypted user content 122 locally encrypted by the data processing hardware 112 using a client-side cryptographic key 212 where the client-side cryptographic key 212 is never exposed to the server 142 of the cloud computing platform 140. At operation 404, the method 400 retrieves from the server 142 of the cloud computing platform 140 the encrypted user content 122 and a token 152 identifying the client-side cryptographic key 212 where the token 152 originates from a third party key manager 150 storing the client-side cryptographic key 212. At operation 406, the method 400 retrieves the client-side cryptographic key 212 from the third party key manager 150 using the token 152. At operation 408, the method 400 decrypts the encrypted user content 122 using the client-side cryptographic key 212.

Figure 5:
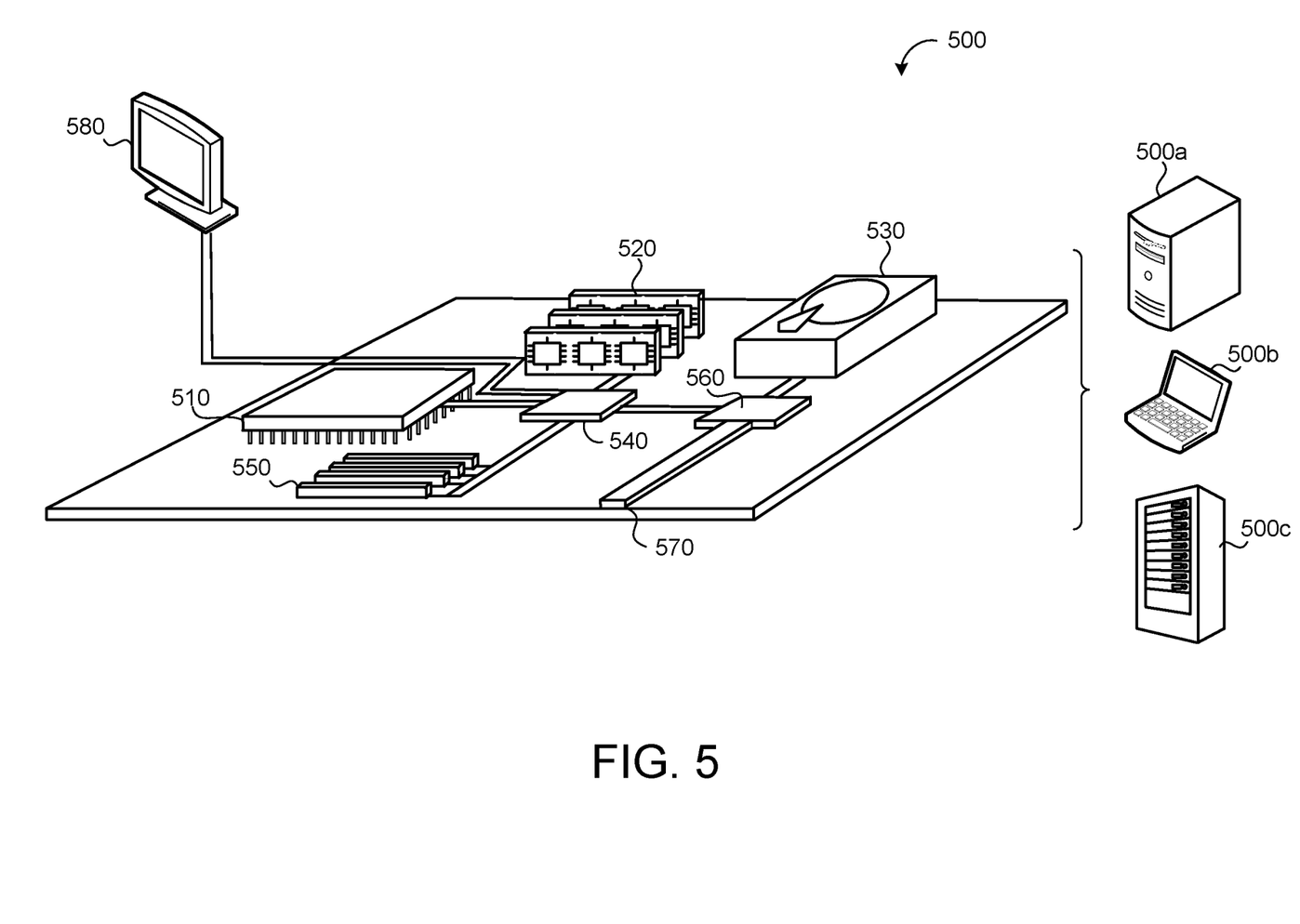
FIG. 5 is a schematic view of an example computing device that may be used to implement the systems and the methods described herein.

FIG. 5 is schematic view of an example computing device 500 that may be used to implement the systems (e.g., the encryption system 200) and methods (e.g., the method 300) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface device 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
obtaining, by data processing hardware, user content comprising a plurality of individual pieces of user content, wherein at least two individual pieces of user content comprise duplicate content;
obtaining, by the data processing hardware, a corresponding client-side cryptographic key for each unique individual piece of user content of the plurality of individual pieces of user content, the corresponding client-side cryptographic key for the at least two individual pieces of user content comprising a same client-side cryptographic key;
locally encrypting, by the data processing hardware, each individual piece of user content of the plurality of individual pieces of user content using the corresponding client-side cryptographic key;
communicating, by the data processing hardware, the client-side cryptographic keys to a third party key manager, the third party key manager configured to protect the client-side cryptographic keys;
after communicating the client-side cryptographic keys to the third party key manager, receiving, at the data processing hardware, a respective cryptographic token for each corresponding client-side cryptographic key from the third party key manager, each respective cryptographic token associated with a corresponding client-side cryptographic key encrypted by a key encryption key protected by the third party key manager; and
uploading, by the data processing hardware, the encrypted user content and the cryptographic token to a server of a cloud computing platform, wherein the server of the cloud computing platform is unable to access the client-side cryptographic keys and the client-side cryptographic keys encrypted by the key encryption key.

2. The method of claim 1, further comprising:
receiving, at the data processing hardware, the user content at a client-facing library associated with an application interface of the cloud computing platform; and
identifying, by the data processing hardware, a user associated with the user content to be stored on the server of the cloud computing platform.

3. The method of claim 1, wherein each client-side cryptographic key comprises a length of 256 bits.

4. The method of claim 1, further comprising, prior to communicating the client-side cryptographic keys, authenticating, by the data processing hardware, the third party key manager.

5. The method of claim 4, wherein authenticating the third party key manager comprises requesting authentication credentials for the third party key manager from an identity provider service, the identity provider service external to the cloud computing platform.

6. The method of claim 1, wherein the third party key manager comprises a different entity than a provider of the cloud computing platform.

7. The method of claim 1, further comprising:
receiving, at the data processing hardware, a retrieval request for retrieving the encrypted user content from the server of the cloud computing platform;
retrieving, by the data processing hardware, the encrypted user content and the cryptographic token from the server of the cloud computing platform;
retrieving, by the data processing hardware, the corresponding client-side cryptographic key for each encrypted individual piece of content of the plurality of encrypted individual pieces of content directly from the third party key manager using the respective cryptographic tokens; and
decrypting, by the data processing hardware, each encrypted individual piece of user content using the corresponding client-side cryptographic key.

8. A method comprising:
receiving, at data processing hardware, a retrieval request for retrieving encrypted user content comprising a plurality of individual pieces of user content stored at a server of a cloud computing platform, each individual piece of user content of the plurality of individual pieces of user content encrypted locally by the data processing hardware using a corresponding client-side cryptographic key, wherein at least two individual pieces of user content comprise duplicate content and the corresponding client-side cryptographic key for the at least two individual pieces of user content comprises a same client-side cryptographic key;
retrieving, by the data processing hardware, from the server of the cloud computing platform the encrypted user content and a respective cryptographic token for each corresponding client-side cryptographic key encrypted by a key encryption key, each respective cryptographic token originating from a third party key manager and configured to decrypt the corresponding client-side cryptographic key using the key encryption key, wherein the server of the cloud computing platform is unable to access the client-side cryptographic keys and the client-side cryptographic keys encrypted by the key encryption key;
retrieving, by the data processing hardware, the corresponding client-side cryptographic key for each encrypted individual piece of content of the plurality of encrypted individual pieces of content directly from the third party key manager using the respective cryptographic tokens; and
decrypting, by the data processing hardware, each encrypted individual piece of user content using the corresponding client-side cryptographic key.

9. The method of claim 8, wherein each client-side cryptographic key comprises a length of 256 bits.

10. The method of claim 8, wherein each client-side cryptographic key is unique.

11. The method of claim 8, further comprising authenticating, by the data processing hardware, the third party key manager.

12. The method of claim 11, wherein authenticating the third party key manager comprises requesting authentication credentials for the third party key manager from an identity provider service, the identity provider service external to the cloud computing platform.

13. The method of claim 8, wherein the third party key manager comprises a different entity than a provider of the cloud computing platform.

14. A system comprising:
data processing hardware; and
memory hardware in communication with the data processing hardware, the memory hardware storing instructions that when executed on the data processing hardware cause the data processing hardware to perform operations comprising:
obtaining user content comprising a plurality of individual pieces of user content, wherein at least two individual pieces of user content comprise duplicate content;
obtaining a corresponding client-side cryptographic key for each unique individual piece of user content of the plurality of individual pieces of user content, the corresponding client-side cryptographic key for the at least two individual pieces of user content comprising a same client-side cryptographic key;
locally encrypting each individual piece of user content of the plurality of individual pieces of user content using the corresponding client-side cryptographic key;
communicating the client-side cryptographic keys to a third party key manager, the third party key manager configured to protect the client-side cryptographic keys;
after communicating the client-side cryptographic keys to the third party key manager, receiving a respective cryptographic token for each corresponding client-side cryptographic key from the third party key manager, each respective cryptographic token associated with a corresponding client-side cryptographic key encrypted by a key encryption key protected by the third party key manager; and
uploading the encrypted user content and the cryptographic token to a server of a cloud computing platform, wherein the server of the cloud computing platform is unable to access the client-side cryptographic keys and the client-side cryptographic keys encrypted by the key encryption key.

15. The system of claim 14, wherein the operations further comprise:
receiving the user content at a client-facing library associated with an application interface of the cloud computing platform; and
identifying a user associated with the user content to be stored on the server of the cloud computing platform.

16. The system of claim 14, wherein each client-side cryptographic key comprises a length of 256 bits.

17. The system of claim 14, wherein the operations further comprise, prior to communicating the client-side cryptographic keys, authenticating the third party key manager.

18. The system of claim 17, wherein authenticating the third party key manager comprises requesting authentication credentials for the third party key manager from an identity provider service, the identity provider service external to the cloud computing platform.

19. The system of claim 14, wherein the third party key manager comprises a different entity than a provider of the cloud computing platform.

20. The system of claim 14, wherein the operations further comprise:
receiving a retrieval request for retrieving the encrypted user content from the server of the cloud computing platform;
retrieving the encrypted user content and the cryptographic token from the server of the cloud computing platform;

retrieving the corresponding client-side cryptographic key for each encrypted individual piece of content of the plurality of encrypted individual pieces of content directly from the third party key manager using the respective cryptographic tokens; and decrypting each encrypted individual piece user content using the corresponding client-side cryptographic key.

21. A system comprising:

data processing hardware; and memory hardware in communication with the data processing hardware, the memory hardware storing instructions that when executed on the data processing hardware cause the data processing hardware to perform operations comprising:

receiving a retrieval request for retrieving encrypted user content comprising a plurality of individual pieces of user content stored at a server of a cloud computing platform, each individual piece of user content of the plurality of individual pieces of user content encrypted locally by the data processing hardware using a corresponding client-side cryptographic key, wherein at least two individual pieces of user content comprise duplicate content and the corresponding client-side cryptographic key for the at least two individual pieces of user content comprises a same client-side cryptographic key;

retrieving from the server of the cloud computing platform the encrypted user content and a respective cryptographic token for each corresponding client-side cryptographic key encrypted by a key encryption key, each respective cryptographic token originating from a third party key manager and configured to decrypt the corresponding client-side cryptographic key using the key encryption key, wherein the server of the cloud computing platform is unable to access the client-side cryptographic keys and the client-side cryptographic keys encrypted by the key encryption key;

retrieving the corresponding client-side cryptographic key for each encrypted individual piece of content of the plurality of encrypted individual pieces of content directly from the third party key manager using the respective cryptographic tokens; and decrypting each encrypted individual piece of user content using the corresponding client-side cryptographic key.

22. The system of claim 21, wherein each client-side cryptographic key comprises a length of 256 bits.

23. The system of claim 21, wherein each client-side cryptographic key is unique.

24. The system of claim 21, wherein the operations further comprise authenticating the third party key manager.

25. The system of claim 24, wherein authenticating the third party key manager comprises requesting authentication credentials for the third party key manager from an identity provider service, the identity provider service external to the cloud computing platform.

26. The system of claim 21, wherein the third party key manager comprises a different entity than a provider of the cloud computing platform.

* * * * *